US012691568B2

(12) United States Patent
French et al.

(10) Patent No.: US 12,691,568 B2
(45) Date of Patent: Jul. 28, 2026

(54) ADJUSTABLE SUPPORT FOR TABLE-MOUNTED TOOLS

(71) Applicants: Marc French, Castiac, CA (US); Dillon French, Castiac, CA (US)

(72) Inventors: Marc French, Castiac, CA (US); Dillon French, Castiac, CA (US)

( * ) Notice: Subject to any disclaimer, the term of this patent is extended or adjusted under 35 U.S.C. 154(b) by 51 days.

(21) Appl. No.: 19/015,235

(22) Filed: Jan. 9, 2025

(65) Prior Publication Data

US 2026/0192436 A1    Jul. 9, 2026

(51) Int. Cl.
*B25H 1/10* (2006.01)
*F16M 11/28* (2006.01)

(52) U.S. Cl.
CPC .............. *B25H 1/10* (2013.01); *F16M 11/28* (2013.01); *F16M 2200/028* (2013.01)

(58) Field of Classification Search
CPC ... B25H 1/10; B25H 1/04; B25H 1/06; F16M 11/28; F16M 2200/028
See application file for complete search history.

(56) References Cited

U.S. PATENT DOCUMENTS 4,119,044 A     10/1978  HInes
5,445,352 A  *   8/1995  Long ...................... G01G 23/20
                                              248/188.7

6,663,062 B1    12/2003  Chapin
6,857,378 B2     2/2005  Franze
7,293,748 B1 *  11/2007  Hoser ................... F16M 11/28
                                              248/354.5
D728,185 S       4/2015  Pelc
10,072,791 B2    9/2018  Beta
2009/0121095 A1  5/2009  Eighmie
2014/0332657 A1 * 11/2014 Thompson ............... B25H 1/04
                                              248/645
2021/0190260 A1 * 6/2021  Johnson, Sr. .......... F16M 11/00
2023/0025229 A1 * 1/2023  Eccard ................. E04H 12/182
2024/0084927 A1 * 3/2024  Boldt ................... B25H 1/04
2025/0189072 A1 * 6/2025  Abilez ................. F16M 11/28

FOREIGN PATENT DOCUMENTS

WO        WO2010042413      4/2010

* cited by examiner

*Primary Examiner* — Daniel J Rohrhoff

(57) ABSTRACT

An adjustable support for table-mounted tools includes a base plate and a base pipe attached to and extending perpendicularly from the base plate. A rod is attached to and extends perpendicularly from the base plate. The rod is positioned within the base pipe. An adjustment pipe is positioned within the base pipe and around the rod. The adjustment pipe is adjustable up and down by rotation of the adjustment pipe, which is in threaded engagement with the rod. A platform is attached to the adjustment pipe. The platform is designed to support a table-mounted tool detachably mounted on the platform. A locking pin is designed to be selectively inserted through the slots of the base pipe and a selected one of the pairs of apertures of the adjustment pipe to prevent rotation of the adjustment pipe with respect to the rod.

10 Claims, 7 Drawing Sheets

ADJUSTABLE SUPPORT FOR TABLE-MOUNTED TOOLS

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to tool mounts and more particularly pertains to a new adjustable support for table-mounted tools. Regular tables are used to support heavy tools that require strong stability, such as vises and grinders. However, these are not adjustable. The new adjustable support provides a stable mounting surface for such tools, but which is adjustable in height for different users and jobs.

(2) Description of Related Art Including Information Disclosed Under 37 CFR 1.97 and 1.98

The prior art relates to tool mounts and supports, which can be mobile or adjustable, but which are only suitable for holding lightweight tools or loose materials. The prior art, as best understood, does not disclose an adjustable support for table-mounted tools, such as vises and grinders. The adjustable support includes a base plate that is securable to a floor, a base pipe extending from the base plate, and an adjustment pipe that is vertically adjustable within the base pipe. A platform is attached to the adjustment pipe. The platform is designed to support a table-mounted tool detachably mounted on the platform.

(h) BRIEF SUMMARY OF THE INVENTION

An embodiment of the disclosure meets the needs presented above in an adjustable support generally comprising a base plate and a base pipe attached to and extending perpendicularly from the base plate. The base pipe includes a pair of slots adjacent a free end of the base pipe. The slots are positioned diametrically opposed and in alignment with one another to form a passage through the base pipe. A rod is attached to and extends perpendicularly from the base plate. The rod is positioned within the base pipe. The rod has a male threading on an exterior surface of the rod. An adjustment pipe is positioned within the base pipe and around the rod. The adjustment pipe includes an upper pipe portion projecting out of the base pipe; a plurality of pairs of apertures is positioned diametrically opposed and in alignment with one another to form passages through the adjustment pipe; and a female threading on an interior surface of the adjustment pipe. The female threading is engaged with the male threading of the rod such that the adjustment pipe is adjustable up and down by rotation of the adjustment pipe. A platform is attached to the upper pipe portion of the adjustment pipe. The platform is designed to support a table-mounted tool detachably mounted on the platform. A locking pin is designed to be selectively inserted through the slots of the base pipe and a selected one of the pairs of apertures of the adjustment pipe to prevent rotation of the adjustment pipe with respect to the rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
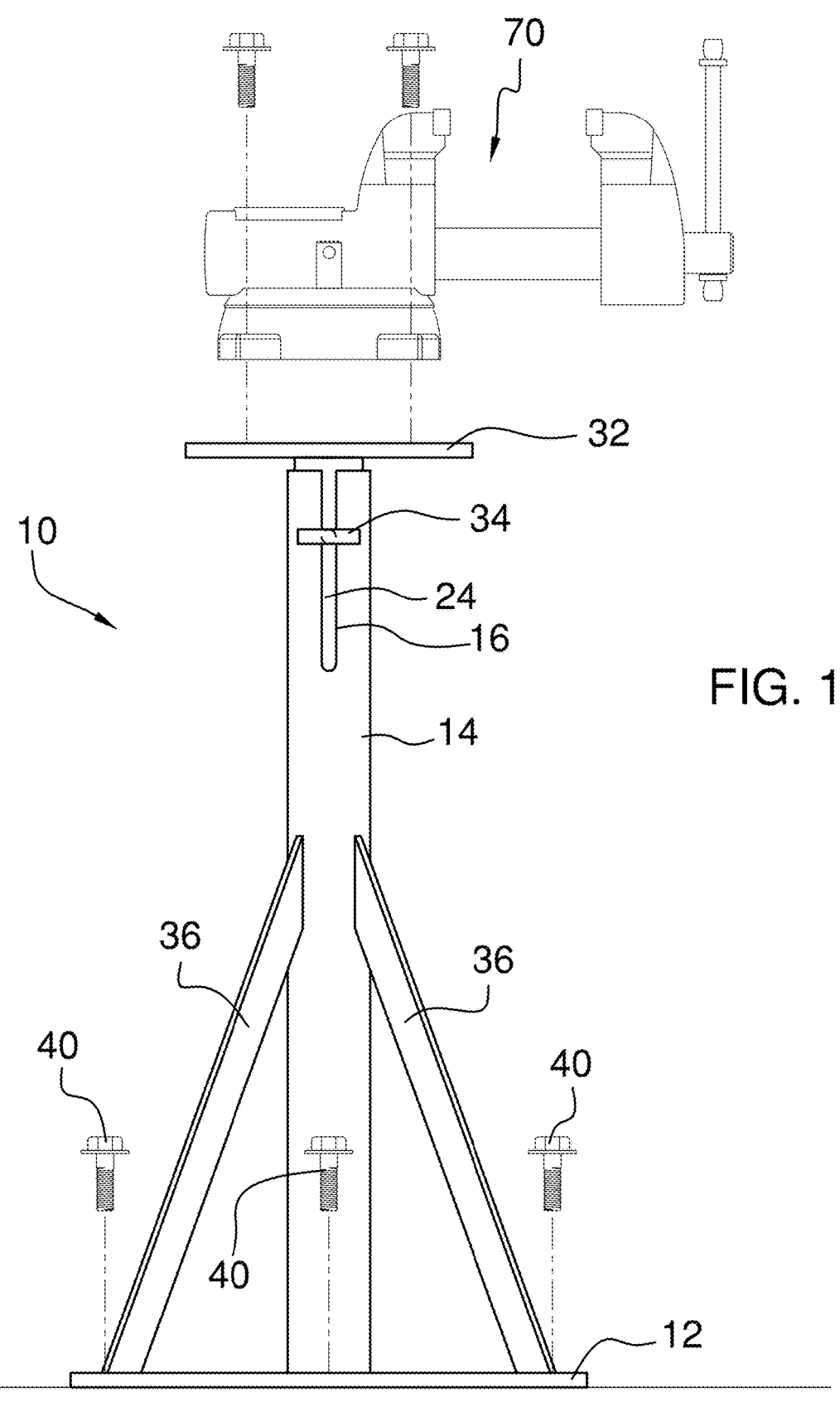
FIG. 1 is a side view of an adjustable support according to an embodiment of the disclosure in use.

With reference now to the drawings, and in particular to FIGS. 1 through 7 thereof, a new adjustable support embodying the principles and concepts of an embodiment of the disclosure and generally designated by the reference numeral 10 will be described.

Figure 2:
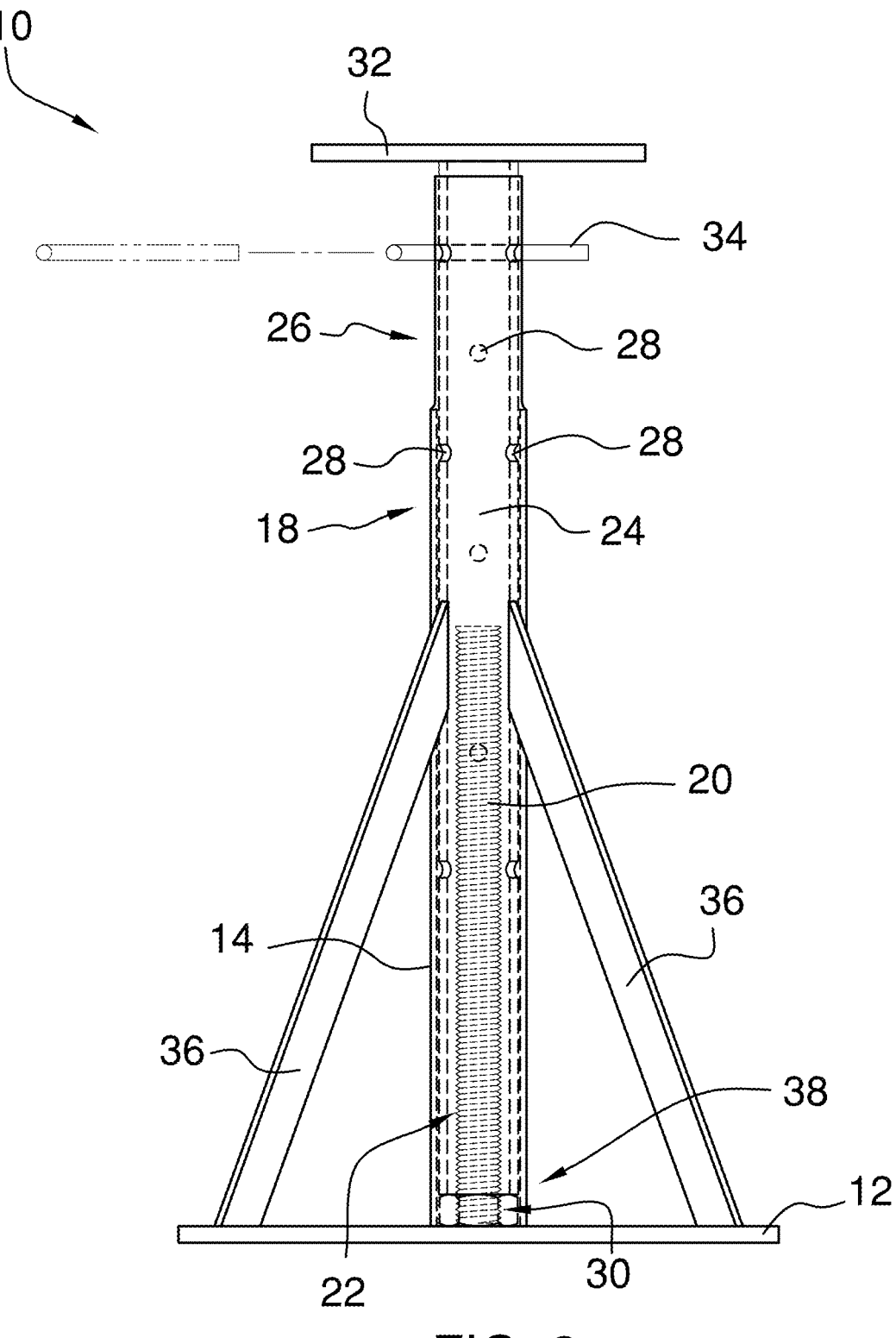
FIG. 2 is a side view of an embodiment of the disclosure.
Figure 3:
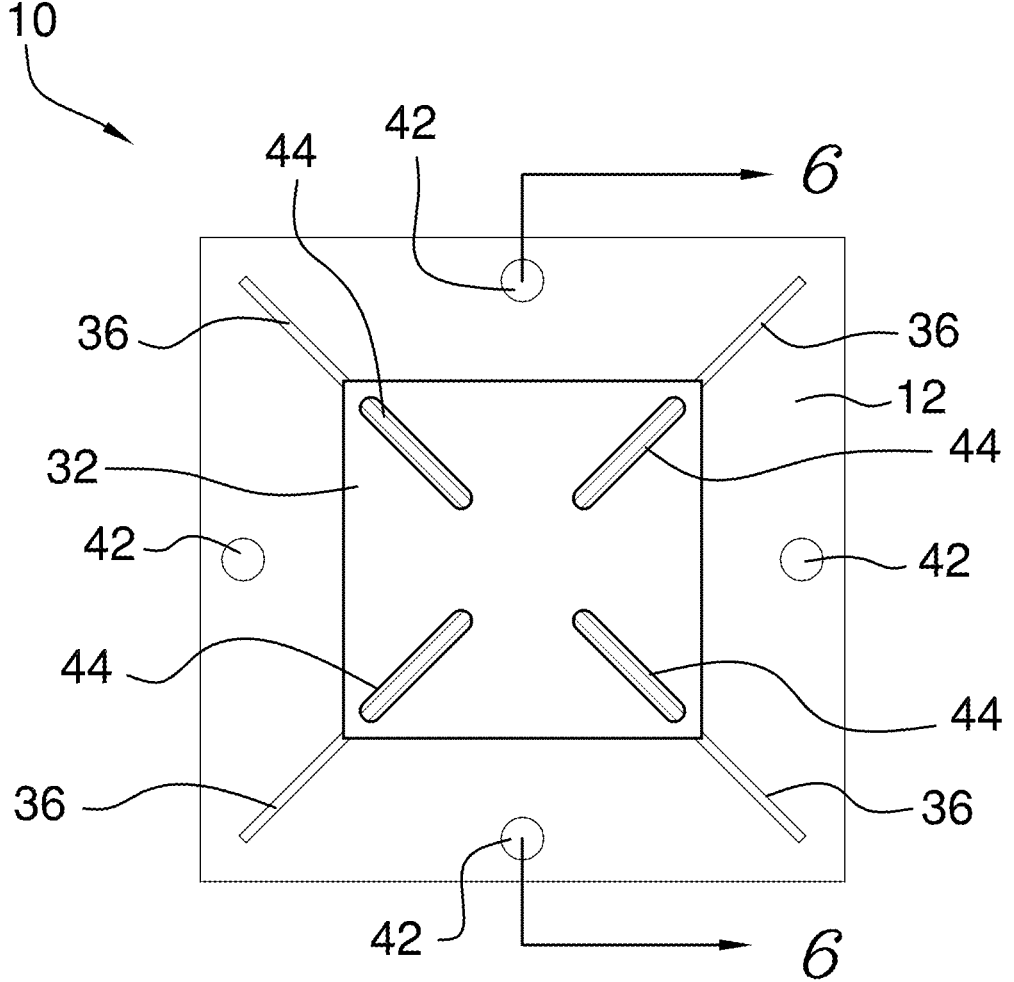
FIG. 3 is a top view of an embodiment of the disclosure.
Figure 4:
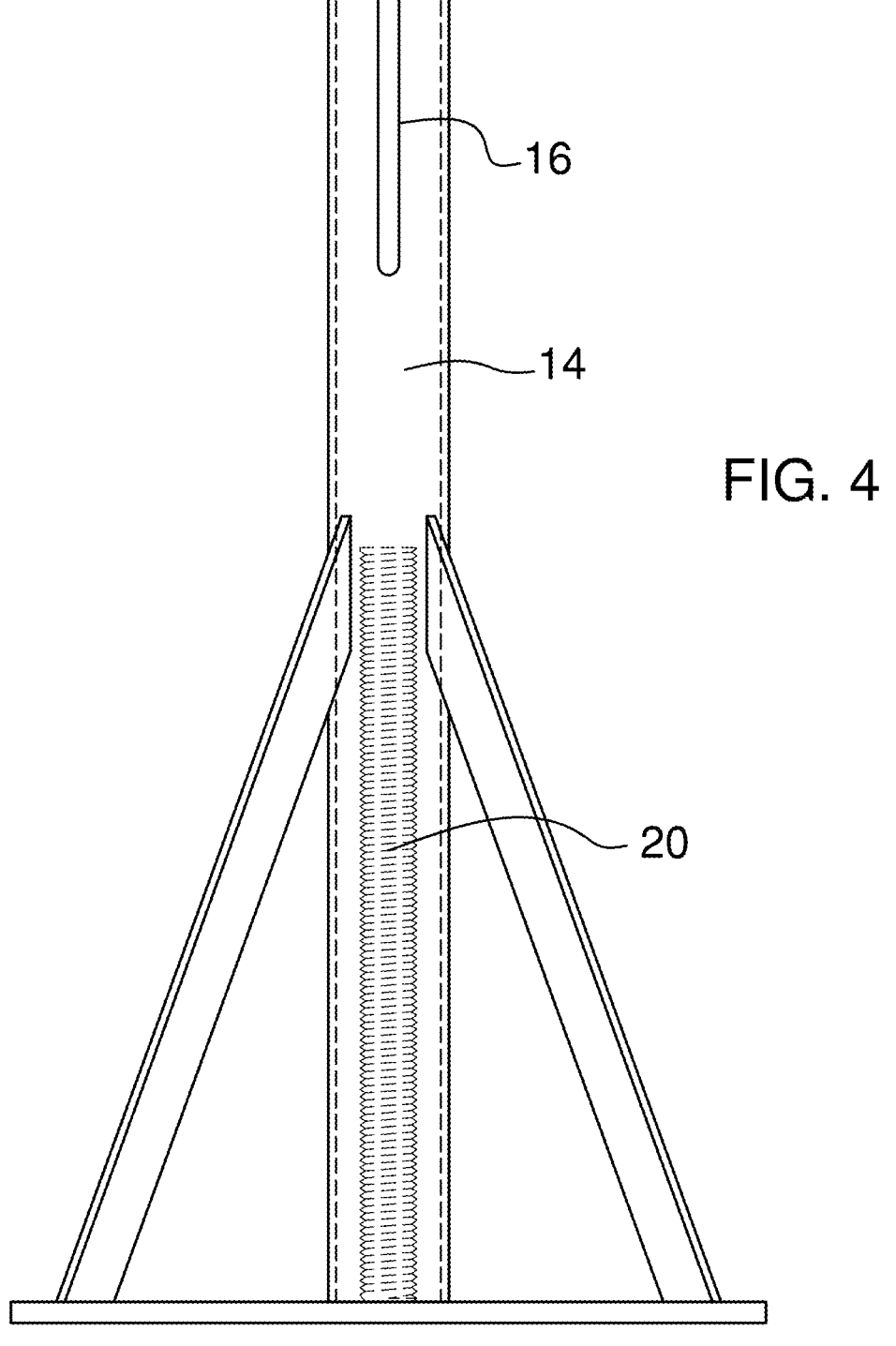
FIG. 4 is a side view of a component of an embodiment of the disclosure.
Figure 5:
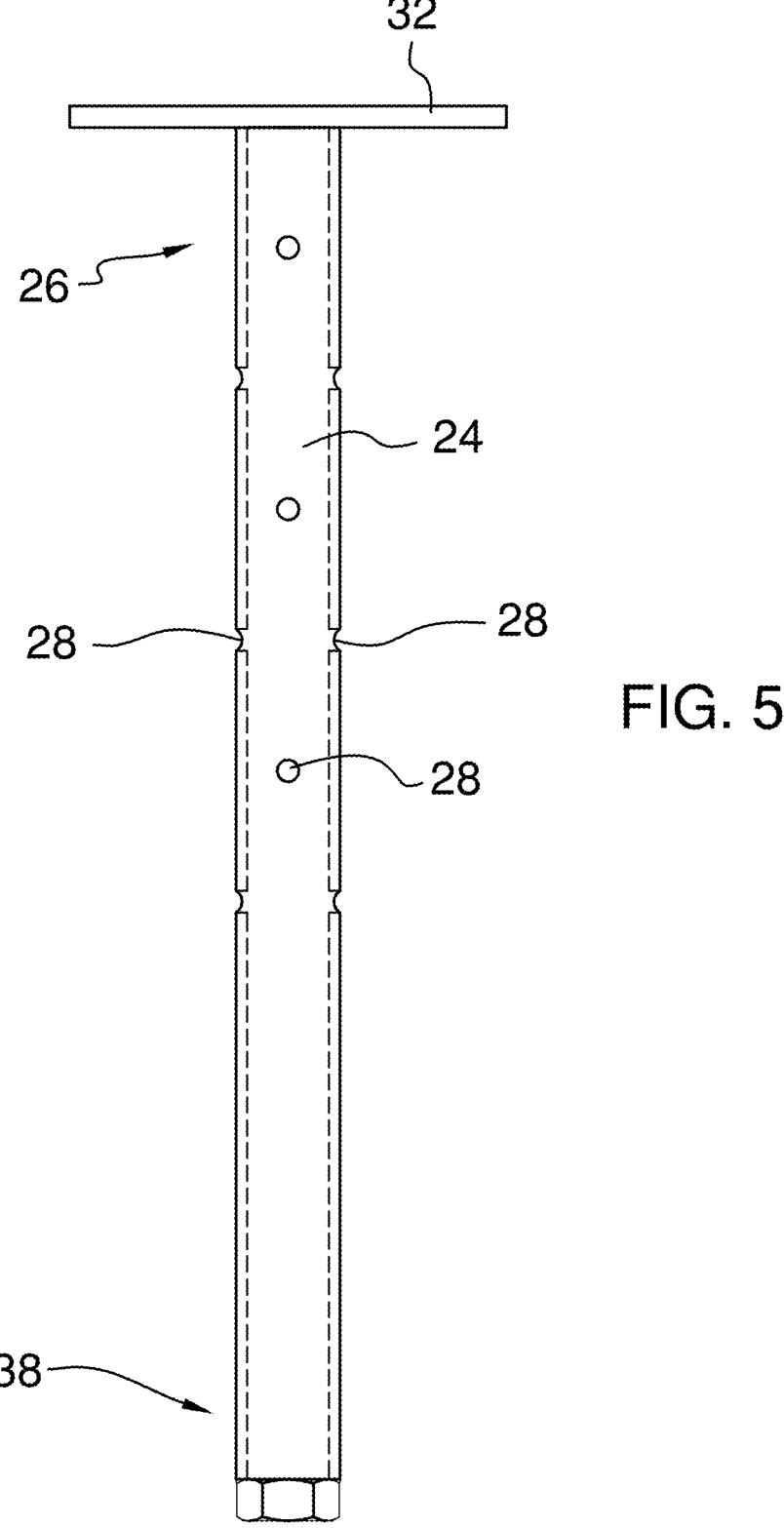
FIG. 5 is a side view of a component of an embodiment of the disclosure.
Figure 6:
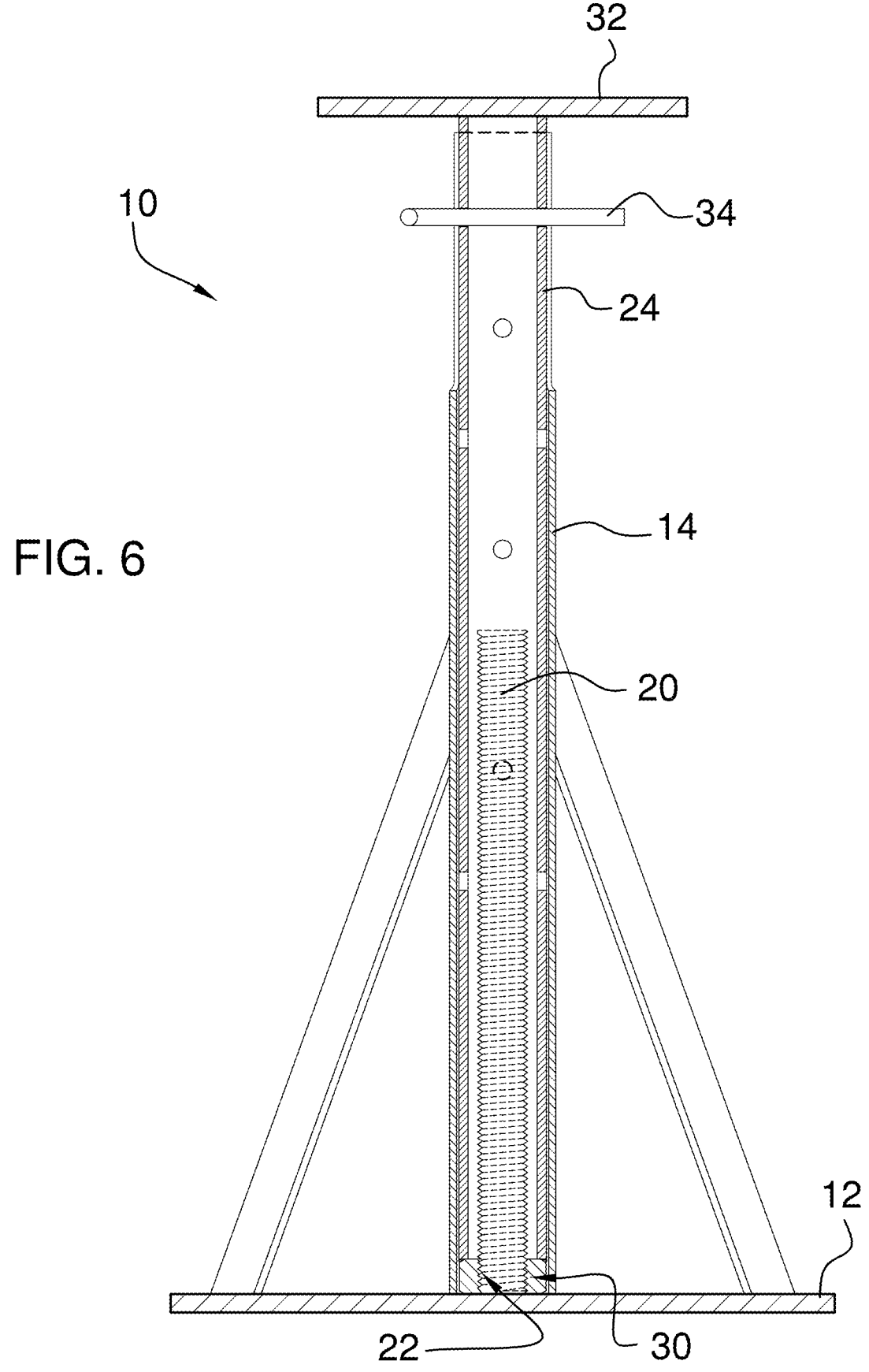
FIG. 6 is a side cross-sectional view of an embodiment of the disclosure.
Figure 7:
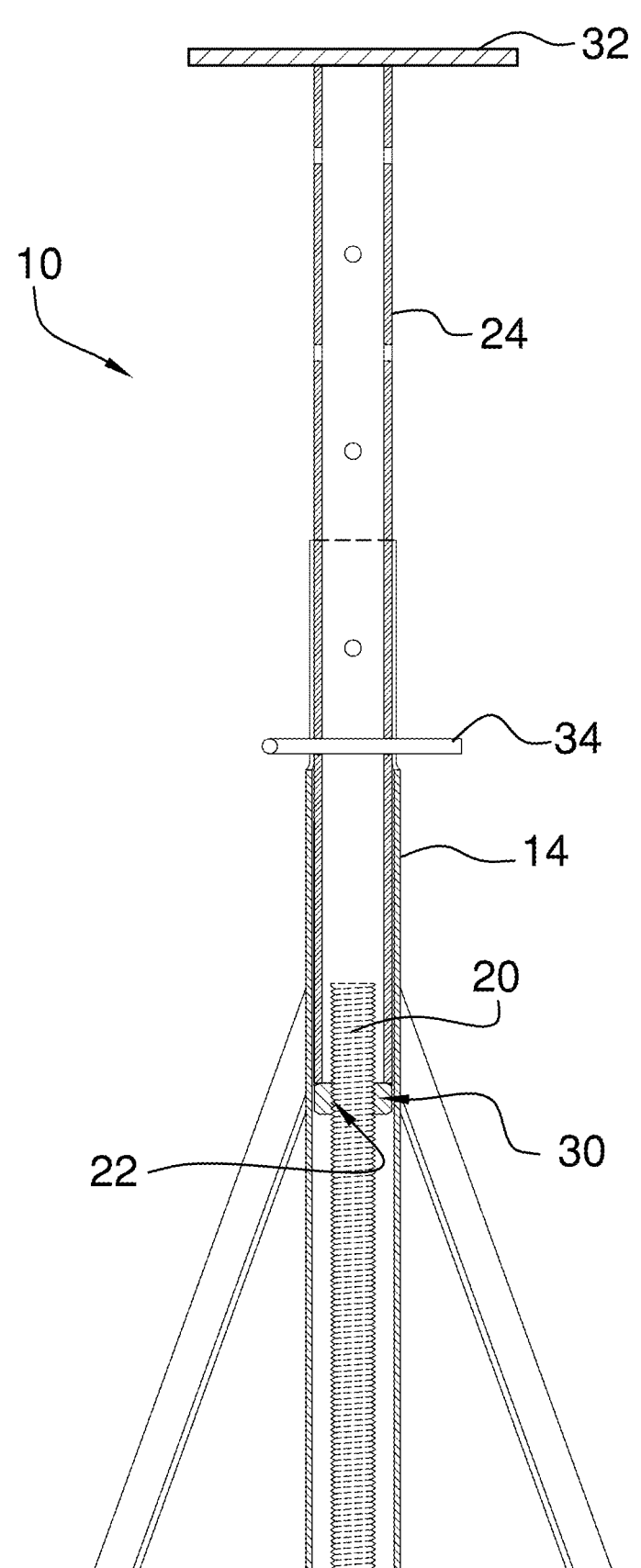
FIG. 7 is a side cross-sectional view of an embodiment of the disclosure.

As best illustrated in FIGS. 1 through 7, the adjustable support 10 generally comprises a base plate 12 and a base pipe 14 attached to and extending perpendicularly from the base plate 12. As best seen in FIG. 4, the base pipe 14 includes a pair of slots 16 adjacent a free end 18 of the base pipe 14. The slots 16 are positioned diametrically opposed and in alignment with one another to form a passage through the base pipe 14. A rod 20 is attached to and extends perpendicularly from the base plate 12. The rod 20 is positioned within the base pipe 14. The rod 20 has a male threading 22 on an exterior surface of the rod 20. An adjustment pipe 24, shown by itself in FIG. 5, is positioned within the base pipe 14 and around the rod 20, as shown in FIG. 6. The adjustment pipe 24 includes an upper pipe portion 26 projecting out of the base pipe 14; a plurality of pairs of apertures 28 positioned diametrically opposed and in alignment with one another to form passages through the adjustment pipe 24; and a female threading 30 on an interior surface of the adjustment pipe 24. As best seen in FIGS. 6 and 7, the female threading 30 is engaged with the male threading 22 of the rod 20 such that the adjustment pipe 24 is adjustable up and down by rotation of the adjustment pipe 24. A platform 32 is attached to the upper pipe portion 26 of the adjustment pipe 24. As shown in FIG. 1, the platform 32 is designed to support a table-mounted tool 70 detachably mounted on the platform 32, such as, for example, a vise. As shown in FIG. 2, a locking pin 34 is designed to be selectively inserted through the slots 16 of the base pipe 14 and a selected one of the pairs of apertures 28 of the adjustment pipe 24 to prevent rotation of the adjustment pipe 24 with respect to the rod 20.

The adjustable support 10 further includes a brace 36 that is attached to the base pipe 14 and the base plate 12. In the exemplary embodiment, the brace 36 is a flat elongated piece extending at an angle. However, in other possible embodiments, other bracing structures could be used, such as a triangular panel or a rod connected by bolts. The exemplary embodiment shows four braces 36, though any number could be used to achieve a desired stability or reinforcement.

The adjustment pipe 24 is hollow and has an internal diameter larger than an external diameter of the rod 20. The adjustment pipe 24 has a lower pipe portion 38 that projects inwardly and has an internal diameter that corresponds to the external diameter of the rod 20. The female threading 30 is positioned on the lower pipe portion 38 in engagement with the male threading 22 of the rod 20. In the exemplary embodiment, the female threading 30 is located on a nut that is integrally formed as part of the adjustment pipe 24.

As shown in FIG. 1, the adjustable support 10 further includes a plurality of anchor bolts 40. The base plate 12 includes a plurality of anchor openings 42. Each of the anchor bolts 40 is designed to be inserted through a respective one of the anchor openings 42 and into a floor to secure the base plate 12 to the floor.

The platform 32 includes a plurality of mounting slots 44 designed to receive mounting bolts of the table-mounted tool 70 to secure the table-mounted tool 70 to the platform 32. The slots 16 allow for different positioning of the table-mounted tool 70 on the platform 32, as well as mounting of different types of the table-mounted tool 70.

Adjacent pairs of the apertures 28 in the adjustment pipe 24 are offset with respect to one another to form passages oriented at different radial positions with respect to a central longitudinal axis of the adjustment pipe 24. Since the adjustment pipe 24 is rotated in order to perform a vertical adjustment, the offset positioning allows the user to secure the adjustment pipe 24 in place in a variety of heights.

The adjustable support 10 can be adjusted as shown in FIGS. 6 and 7. A user can grip and manually turn the platform 32, which thereby turns the adjustment pipe 24. The female threading 30 of the adjustment pipe 24 engages the make threading on the rod 20, which causes the adjustment pipe 24 to move upwardly or downwardly, depending on which way the user is turning the platform 32. The base pipe 14 serves as a guide for the adjustment pipe 24, as well as provides a stabilizing force. Once the user has the platform 32 at a desired height, such as shown in FIG. 7, the user aligns one of the pairs of apertures 28 in the adjustment pipe 24 with the pair of slots 16 in the base pipe 14. The user then inserts the locking pin 34, which can be a T-shaped device, through the pair of apertures 28 and the pair of slots 16. The locking pin 34 thereby prevents rotation of the adjustment pipe 24, which consequently prevents unintended vertical adjustment of the adjustment pipe 24. The platform 32 is now at its desired height and held with great stability. The user then attaches the table-mounted tool 70 with bolts into selected ones of the mounting slots 44, as shown in FIG. 1.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An adjustable support for table-mounted tools comprising:

a base plate;

a base pipe being attached to and extending perpendicularly from said base plate, said base pipe including a pair of slots adjacent a free end of said base pipe, said slots being positioned diametrically opposed and in alignment with one another to form a passage through said base pipe;

a rod being attached to and extending perpendicularly from said base plate, said rod being positioned within said base pipe, said rod having a male threading on an exterior surface of said rod;

an adjustment pipe being positioned within said base pipe and around said rod, said adjustment pipe including:

an upper pipe portion projecting out of said base pipe, a plurality of pairs of apertures being positioned diametrically opposed and in alignment with one another to form passages through said adjustment pipe, a female threading on an interior surface of said adjustment pipe, said female threading being engaged with said male threading of said rod such that said adjustment pipe is adjustable up and down by rotation of said adjustment pipe;

a platform being attached to said upper pipe portion of said adjustment pipe, said platform being configured to support a table-mounted tool detachably mounted on said platform; and a locking pin, said locking pin being configured to be selectively inserted through said slots of said base pipe and a selected one of said pairs of apertures of said adjustment pipe to prevent rotation of said adjustment pipe with respect to said rod.

2. The adjustable support for table-mounted tools of claim 1, further comprising a brace being attached to said base pipe and said base plate.

3. The adjustable support for table-mounted tools of claim 1, wherein:

said adjustment pipe is hollow and has an internal diameter larger than an external diameter of said rod;

said adjustment pipe has a lower pipe portion that projects inwardly and has an internal diameter that corresponds to said external diameter of said rod; and said female threading is positioned on said lower pipe portion in engagement with said male threading of said rod.

4. The adjustable support for table-mounted tools of claim 1, further comprising a plurality of anchor bolts, wherein:

said base plate includes a plurality of anchor openings; and each of said anchor bolts is configured to be inserted through a respective one of said anchor openings and into a floor to secure said base plate to the floor.

5. The adjustable support for table-mounted tools of claim 1, wherein said platform includes a plurality of mounting slots configured to receive mounting bolts of the table-mounted tool to secure the table-mounted tool to said platform.

6. The adjustable support for table-mounted tools of claim 1, wherein adjacent pairs of said apertures in said adjustment pipe are offset with respect to one another to form passages oriented at different radial positions with respect to a central longitudinal axis of said adjustment pipe.

7. The adjustable support for table-mounted tools of claim 2, wherein:

said adjustment pipe is hollow and has an internal diameter larger than an external diameter of said rod;

said adjustment pipe has a lower pipe portion that projects inwardly and has an internal diameter that corresponds to said external diameter of said rod; and said female threading is positioned on said lower pipe portion in engagement with said male threading of said rod.

8. The adjustable support for table-mounted tools of claim 7, further comprising a plurality of anchor bolts, wherein:

said base plate includes a plurality of anchor openings; and each of said anchor bolts is configured to be inserted through a respective one of said anchor openings and into a floor to secure said base plate to the floor.

9. The adjustable support for table-mounted tools of claim 8, wherein said platform includes a plurality of mounting slots configured to receive mounting bolts of the table-mounted tool to secure the table-mounted tool to said platform.

10. The adjustable support for table-mounted tools of claim 9, wherein adjacent pairs of said apertures in said adjustment pipe are offset with respect to one another to form passages oriented at different radial positions with respect to a central longitudinal axis of said adjustment pipe.

* * * * *